United States Patent Office 3,094,557
Patented June 18, 1963

3,094,557
PROCESS FOR THE PRODUCTION OF CIS OR TRANS - 1,2,3,4 - TETRAHYDRONAPHTHALENE DICARBOXYLIC ACID-(1,4)
Rudolf Gabler, Zollikerberg, Zurich, and Theodor Lyssy, Zurich, Switzerland, assignors to W. R. Grace & Co., Cambridge, Mass., a corporation of Connecticut
No Drawing. Filed May 18, 1960, Ser. No. 29,824
4 Claims. (Cl. 260—515)

This invention relates to the preparation of the stereo isomers of tetrahydronaphthalene dicarboxylic acid-(1,4) in substantially pure form and, more particularly, to a process in which a dihydronaphthalene dicarboxylic acid-(1,4) is hydrogenated, in the presence of a catalyst at a pH of 7 to 10 and at a temperature below 150° C., to produce such isomers.

The use of dihydronaphthalene dicarboxylic acid-(1,4) for various technical purposes such as the preparation of plasticizers, polyamides, or other condensation resins has been proposed. Such products, however, have only a limited resistance to heat due apparently to the olefinic double bond present between the carboxylic acid groups. This double bond, at higher temperatures, is susceptible to oxidation and other side reactions which result in discoloration of the final polymeric product.

We have found the heat stable and technically valuable dicarboxylic acid reactant can be obtained by hydrogenating dihydronaphthalene dicarboxylic acid-(1,4) to the tetrahydro state. The product of the hydrogenation is 1,2,3,4-tetrahydronaphthalene dicarboxylic acid-(1,4) otherwise known as tetralin-1,4-dicarboxylic acid. This dicarboxylic acid, when used as a reactant in the polymerization reaction, yields a polymeric product which does not discolor at high temperature.

Normal hydrogenation of dihydronaphthalene dicarboxylic acid-(1,4) is accompanied by unexpected complications, one of which is a migration of the double bond present in the dihydro acid. This migration takes place very easily, and interferes with a successful hydrogenation of the dihydro acid. Even when a hydrogenation is achieved, a eutectic mixture of cis and trans isomers of the tetrahydro acid is obtained which is oily or semisolid at room temperature, is difficult to separate and, because of its low melting point, is not well suited for purposes of polycondensation.

We have now discovered a method for obtaining at will either cis- or trans-tetrahydronaphthalene dicarboxylic acid-(1,4) in a sterically homogeneous state. Either stereo isomer of tetrahydronaphthalene dicarboxylic acid-(1,4) has a higher melting point than the eutectic mixture and can be separated in a crystalline state at ordinary room temperature. These substantially pure stereo isomers are well suited for polycondensation or other polymeric reactions, and their use permits the control of the melting points of the resinous products made therefrom.

An object of this invention is the preparation of tetrahydronaphthalene dicarboxylic acid and its derivatives in either the cis or trans form.

It was found that the isomeric quality and yield of the tetrahydronaphthalene dicarboxylic acids-(1,4) and their salts, as produced by the hydrogenation of the corresponding salts of the dihydro acid, depends to a large extent upon the pH of the solution and the temperature of hydrogenation. Thus it is possible to regulate the isomeric quality of the tetrahydro acids by regulating the pH and temperature of the reactants during hydrogenation. In the case of the trans-tetrahydro acid, the hydrogenation of the corresponding trans-dihydro acid, which is received on acidification of the reaction mass of sodium naphthalene and carbon dioxide, should be carried out at a pH of 7 to 10 and at a temperature not substantially in excess of 150° C. At a pH below 7, it is not possible to obtain the desired product because the reactant, the trans-dihydro acid, precipitates and affects the catalyst used in the hydrogenation. At a pH above 10, a partial migration of the double bond may take place depending on the temperature of hydrogenation. This migration may be illustrated as follows:

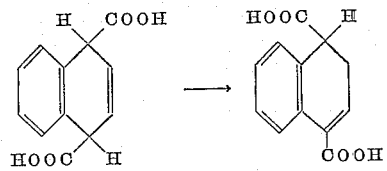

It is to be noted that this leads to a reaction mixture containing both 1,2- and trans-1,4-dihydronaphthalene dicarboxylic acids-(1,4) which upon hydrogenation results in the tetrahydro acid being produced in both a cis and trans configuration. The results of the reaction can best be observed by the melting point of the raw acid precipitated after the hydrogenation in comparison to the melting point of the pure trans-tetrahydro acid, which has a melting point above 213° C. All products which show a lower melting point contain either detectable amounts of unhydrogenated 1,2-dihydro acid or the cis isomer of the corresponding tetrahydro acid as can be shown by spectrographic analysis and acid titration. These mixtures of dicarboxylic acids, which can only be separated with great difficulty, result in the complications encountered in the prior art heretofore mentioned.

It is also surprising to note that in the case of the cis-tetrahydro acid the hydrogenation of the corresponding reactant, i.e. the cis-dihydro acid or the 1,2-dihydro acid, should also be carried out at a pH of 7 to 10 and at a hydrogenation temperature not substantially in excess of 150° C. A pH above 7 is used for reasons of solubility while a pH below 10 is preferred because on prolonged heating at high temperatures in strong base the carboxyl groups in both the reactant and product are susceptible to decarboxylation. The temperature range is also limited because it is known that on heating the cis-dihydro acid at high temperatures, 180–200° C., a partial spacial rearrangement may take place which would result in the trans-dihydro acid being obtained, which on hydrogenation under such conditions would yield tetrahydro acid in the trans state. Thus if the temperature were not controlled, one would obtain a eutectic mixture as a product. It is also of interest to note that the 1,2-dihydro acid, which is used in this particular case, can be prepared by boiling the trans-1,4-dihydro acid in 2 N sodium hydroxide. The catalytic hydrogenation of the alkali salts of this 1,2-dihydro acid leads nearly quantitatively to cis-tetrahydronaphthalene dicarboxylic acid-(1,4) in a sterically homogeneous state.

Surprisingly the spacial configuration of the carboxylic acid substituent in the 1,4-position after and during the hydrogenation is not determined by thermodynamic factors, as is true in most cases, it is only dependent on the position of the double bond in the starting material as illustrated below:

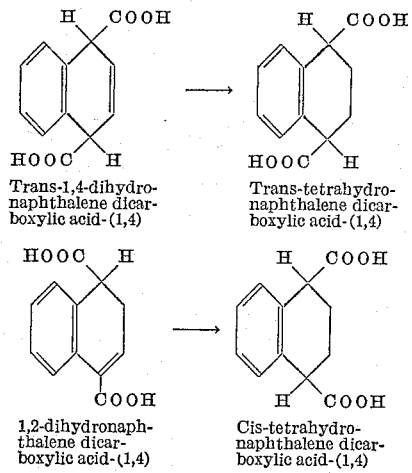

Trans-1,4-dihydronaphthalene dicarboxylic acid-(1,4)

Trans-tetrahydronaphthalene dicarboxylic acid-(1,4)

1,2-dihydronaphthalene dicarboxylic acid-(1,4)

Cis-tetrahydronaphthalene dicarboxylic acid-(1,4)

Using this discovery either cis- or trans-tetrahydronaphthalene dicarboxylic acid-(1,4) can be easily prepared, in high yields and a high state of purity using the same starting material, simply by controlling the position of the double bond in the dihydro acid reactant by controlling the pH. This is of great practical importance because the polymeric products i.e. polyesters and polyamides ultimately produced from the tetrahydro acids differ widely in their properties depending upon whether this reactant is in either a cis or trans spacial configuration, or represents a mixture of both configurations.

A titration curve of the reaction mixture would show that the pH range, i.e. 7 to 10, which is favorable to the hydrogenation is passed through very quickly during the neutralization of the free dihydro acid. It was found that the conventional neutralization of the acid with sodium hydroxide, using phenolphthalein as an indicator, leads very rapidly into the critical pH range, i.e. a range greater than 10. It is, therefore, advisable to carry out the pH adjustment potentiometrically. When a migration of the double bond has taken place, due to a pH greater than 10, even the mildest hydrogenation conditions give only low melting isomeric mixtures. It is possible to recognize the results of a poor hydrogenation by a test, in which on acidification with mineral acids the dicarboxylic acid precipitates as an oil or semi-solid instead of a crystalline solid.

The hydrogenation, according to this invention, may be carried out at a pressure up to 150 atmospheres. A pressure between 100 and 120 atmospheres is however preferred.

Catalyst such as nickel prepared from a Ni—Al alloy, or by reduction of nickel oxides or nickel salts are especially suitable. These catalysts may be used in amounts between 1 to 20% by weight based on the amount of dihydro acid used. We have preferably used an amount between 5 to 10%. The hydrogenation may be carried out continuously. In such a case, it is advantageous to pass the hydrogen through the reaction pipe counter-currently to the dihydro acid solution. Suitable carriers for the nickel catalyst include diatomaceous earth, silica gel, and aluminum oxide. The nickel catalyst may also be promoted with copper, silver, manganese, and other heavy metals. There are other metal catalysts which may be used in the described process and these include platinum, platinum oxide, and palladium. In such a case low hydrogen pressures of about 3 atmospheres may be sufficient.

The following examples will give a more detailed picture of this invention.

EXAMPLE I

Ten grams of crude 1,4-dihydronaphthalene dicarboxylic acid-(1,4), which had been previously washed with a small amount of water and dried, was added with stirring to 5 cc. of methanol. The melting point of this acid was between 196° C. to 202° C. 40 cc. of water was then added to this mixture followed by the slow addition thereto of a solution containing 5 g. of NaOH in 20 cc. of water. This latter solution was ice cooled. At this point the dicarboxylic acid went into solution as its sodium salt.

The pH of the solution was adjusted to 7 using glacial acetic acid. The turbid solution was then filtered and the clear filtrate brought to a volume of 85 cc. by the addition of water. The pH was again adjusted to 7.

The solution was transferred to an autoclave having a capacity of about 500 cc., 1.5 grams of a Raney nickel catalyst being added to the solution. The autoclave was then purged twice the nitrogen. At this point 120 atmospheres of hydrogen were introduced into the autoclave and the temperature was raised to 120° C. At the end of 16 hours the autoclave was cooled and the pressure released.

The catalyst was then filtered from the reaction solution and the yellowish filtrate was acidified with concentrated HCl. Crystals, being slightly yellowish in color, began to precipitate from the filtrate upon acidification. The reaction solution was again filtered with suction, and the crystals obtained were washed with a small amount of water and then dried in a vacuum oven. These crystals, which represented trans-tetrahydronaphthalene dicarboxylic acid-(1,4), were found to have a melting point between 209° C. to 216° C. The total yield obtained represented 72% of the amount theoretically obtainable under the same conditions.

EXAMPLE II

Fifty grams of 1,4-dihydronaphthalene dicarboxylic acid-(1,4), which had been previously washed with glacial acetic acid, was added with stirring to 25 cc. of methanol. The melting point of this diacid was between 204° C. and 208° C. 200 cc. of water were then added to this mixture followed by the slow addition thereto, with stirring and cooling, of an ice cooled solution containing 25 g. of NaOH in 100 cc. of water. At this point the dicarboxylic acid went into solution as its sodium salt.

The pH was adjusted to 7.35 using glacial acetic acid. The turbid solution was then filtered and the yellowish filtrate brought to a volume of 425 cc. by the addition of water. The pH was again adjusted to 7.35.

The solution was then transferred to an autoclave having a capacity of about 500 cc. and 7.5 grams of a Raney nickel catalyst were added thereto. The autoclave was then purged twice with nitrogen. At this point 120 atmospheres of hydrogen were introduced into the autoclave and the temperature was raised to 50° C. At the end of 16 hours the autoclave was cooled and the pressure released.

The catalyst was then filtered from the reaction solution and the colorless filtrate acidified with concentrated HCl. Upon acidification white crystals began to form. The reaction solution was again filtered and the crystals obtained were washed with water and dried in a vacuum oven. These crystals, which represented trans-tetrahydronaphthalene dicarboxylic acid-(1,4), were found to have a melting point between 215° C. and 221° C. The total yield obtained represented 95% of the amount theoretically obtainable under the same conditions.

Further results obtained according to the procedure set forth in Examples I and II but with various temperatures and pH during hydrogenation may be tabulated as follows:

Table I

| | pH | Temperature | | | | | | | | | | | | | | |
|---|---|---|---|---|---|---|---|---|---|---|---|---|---|---|---|---|
| | | 50° C. | | | 90° C. | | | 120° C. | | | 150° C. | | | 200° C. | | |
| | | M.P. | Percent Yield | Precipitate | M.P. | Percent Yield | Precipitate | M.P. | Percent Yield | Precipitate | M.P. | Percent Yield | Precipitate | M.P. | Percent Yield | Precipitate |
| 1,4-dihydro acid. | 7 | | | | | | | 216–220 | 85 | Cryst. | | | | | | |
| | 7.35 | 215–222 | 95.5 | Cryst. | | | | | | | | | | | | |
| | 8.00 | 216–221 | 93 | Cryst. | | | | | | | | | | | | |
| | 8.5 | 218–221 | 90 | Cryst. | | | | | | | | | | | | |
| | 9.0 | | | | 218–221 | 89 | Cryst. | 216–219 | 92 | Cryst. | 215–219 | 79 | Cryst. | 153–195 | 70 | oily. |
| | 9.5 | 216–218 | 86 | Cryst. | | | | | | | | | | | | |
| | 10.0 | | | | 215–221 | 87 | Cryst. | 214–216 | 83 | Cryst. | 213–217 | 80 | Cryst. | 181–208 | 70 | oily. |

To show the preparation of the cis isomer the following experiments were performed.

EXAMPLE III 1,4-dihydronaphthalene dicarboxylic acid-(1,4) having a melting point of 204° C. to 208° C. was converted into its sodium salt as set forth in Example I. The solution was subsequently neutralized with glacial acetic acid and then the pH was brought to 11 using 0.1 NaOH. After this the solution was heated for one hour at 100° C. by means of an oil bath.

A small sample of this solution was then precipitated with concentrated HCl and the crystals which formed were recrystallized from glacial acetic acid. These crystals provide to be identical to 1,2-dihydronaphthalene dicarboxylic acid-(1,4) having a melting point of 230–232° C.

The main part of the aforementioned solution (85 cc.) containing 10 grams of 1,2-dihydronaphthalene dicarboxylic acid-(1,4) were transferred to a 500 cc. autoclave and hydrogenated using the procedure described in Example II, using 1.5 grams of a Raney nickel catalyst.

After 16 hours the catalyst was removed by filtration and the filtrate acidified with concentrated HCl. Upon acidification a colorless oil precipitated which solidified after a short while producing crystals melting from 166° C. to 201° C. A second fraction was found to precipitate from the acid solution on standing overnight. These latter crystals melted between 167 and 176° C. The total yield obtained represented 83% of the theoretical.

EXAMPLE IV

Twenty grams of 1,4-dihydronaphthalene dicarboxylic acid-(1,4) melting from 204° C. to 208° C. were dissolved in 200 cc. of 2 N NaOH. The resulting solution was then heated on a steam bath for about 2 hours.

The solution was then acidified with concentrated HCl and small crystals representing 1,2-dihydronaphthalene dicarboxylic acid-(1,4) were obtained. The yield obtained was between 75% to 80% of the theoretical. These crystals upon recrystalization from hot glacial acetic acid produced needles having a melting point between 229° C. to 231° C.

9 grams of 1,2-dihydronaphthalene dicarboxylic acid-(1,4) were mixed with 20 cc. of water and 4.5 cc. of methanol. The mixture was neutralized, with cooling, by the addition of a 10% NaOH solution and the pH was adjusted to 7.5.

The solution was transferred to an autoclave and hydrogenated using the procedure described in Example I. In this case, however, only 1.0 gram of Raney nickel was used as catalyst.

After 16 hours the catalyst was removed by filtration and the clean filtrate was acidified with 6.3 cc. of concentrated HCl. After a short time tiny needles began to crystallize. These needles representing cis-tetrahydronaphthalene dicarboxylic acid-(1,4) were found to have a melting point of 181–183° C. The mother liquid was extracted with ether and yielded additional crystals melting between 168.5° C. and 175.5° C. The total yield obtained represented 80% to 90% of the theoretical.

We claim:

1. A process for preparing stereoisomers of the alkali salts of 1,2,3,4-tetrahydronaphthalene dicarboxylic acid-(1,4) which comprises hydrogenating an aqueous solution of an alkali salt of a member selected from the group consisting of trans-1,4-dihydronaphthalene dicarboxylic acid-(1,4) and 1,2-dihydronaphthalene dicarboxylic acid-(1,4) in the presence of a hydrogenation catalyst at a pH between 7 and 10 and a temperature not substantially in excess of 150° C.

2. A process according to claim 1 wherein the resulting hydrogenated salt is acidified.

3. A process according to claim 2 wherein trans-1,2,3,4-tetrahydronaphthalene dicarboxylic acid-(1,4) is formed by hydrogenating the sodium salt of trans-1,4-dihydronaphthalene dicarboxylic acid-(1,4) and thereafter acidifying the resulting hydrogenated salt.

4. A process according to claim 2 wherein cis-1,2,3,4-tetrahydronaphthalene dicarboxylic acid-(1,4) is formed by hydrogenating the sodium salt of 1,2-dihydronaphthalene dicarboxylic acid-(1,4) and thereafter acidifying the resulting hydrogenated salt.

References Cited in the file of this patent

UNITED STATES PATENTS 2,065,756    Scott    Dec. 29, 1936

OTHER REFERENCES

Jiang: "Chem. Abstracts," vol. 52, p. 15481, 1958. (Available in Sci. Library.)